United States Patent Office 3,330,206
Patented July 11, 1967

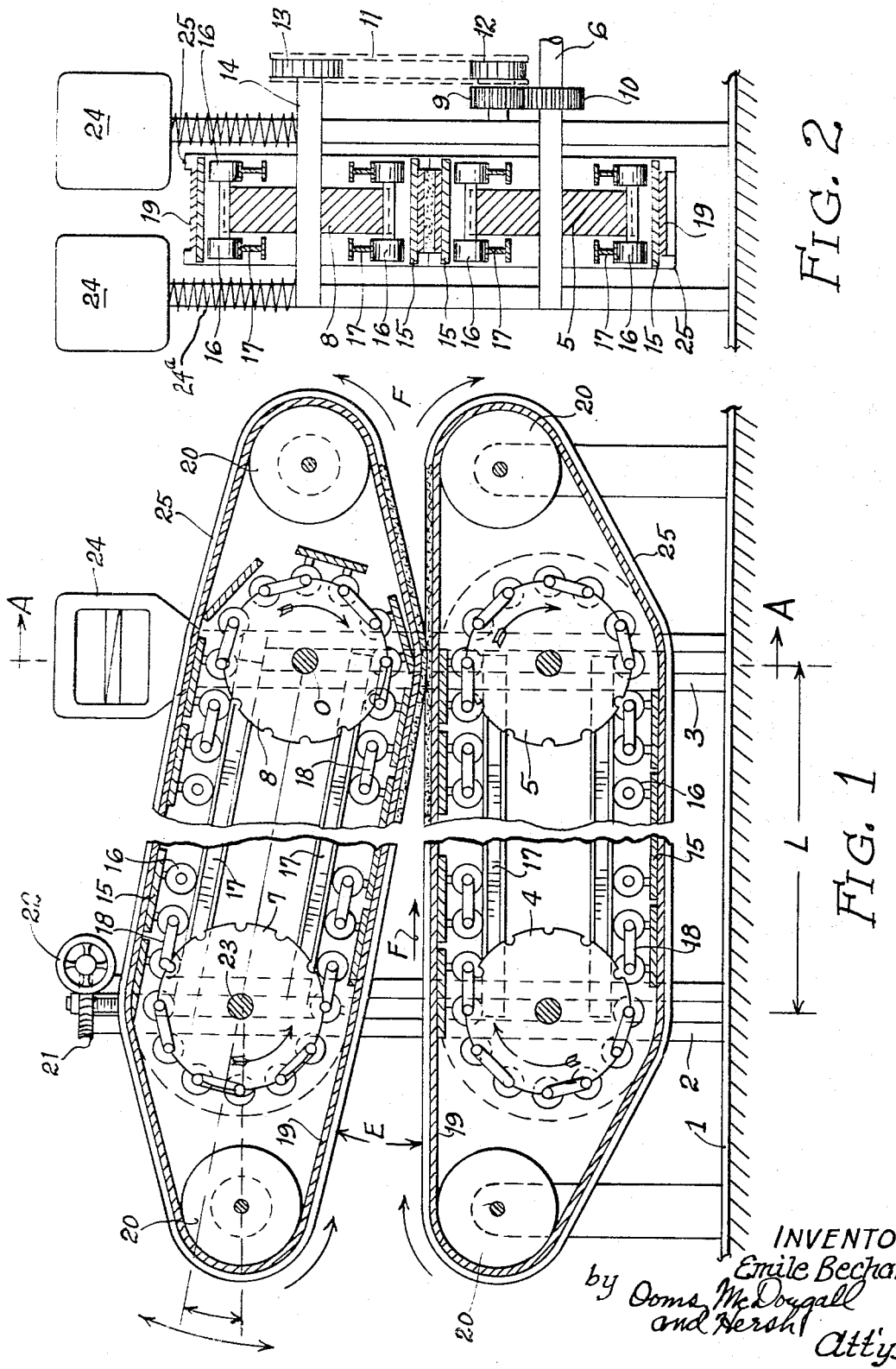

3,330,206
CONTINUOUS FILTER PRESS
Emile Bechard, Paris, France, assignor to R. G. Le Vaux
Filed May 10, 1963, Ser. No. 279,653
2 Claims. (Cl. 100—153)

The extraction and clarifying of juice by machines known as filter-presses is well-known.

The liquid coming to the machine is discharged between two filter cloth elements supported by trays.

Since the juice runs off due to the action of the pressing pressure, there remains between the two cloth elements, held by two trays, what is known as a cake.

When the space between the cloth elements is filled, the operation must be stopped, the trays demounted, the cakes extracted, then the components put together again before the machine can be restarted. On numerous occasions the cloth elements should be washed since they become stopped up from prolonged pressing.

In the present invention FIGURE 1 is a longitudinal section, FIGURE 2 a section through A.A.

The unit has a base plate 1 to which are fastened the inlet 2 and outlet 3 uprights. The uprights carry slotted gears 4 and 5. The gears are drive gears driven one way or the other by a shaft 6.

This unit is stationary.

Above is an identical unit with the difference that it can go up and down in the uprights which act as slides and pivot around shaft O.

In this unit are fitted gears 7 and 8, the latter being coupled with 5 by a reversing coupling 9 and 10 and a chain 11 on gears 12 and 13, the latter being keyed to shaft 14.

On gears 4, 5 and 7, 8 are fitted chains equipped with caterpillar treads or shoes 15 resting on two series of rollers 16, which will serve as a bearing surface when rolling on rails 17. Two successive shoes are linked by side couplings 18.

Striated or corrugated plates are fastened to the shoes for drainage, then above metal cloth, perforated sheet steel or expanded metal plates act as supports for components, filter cloth elements 19, which wind around drums 20.

Pivoting around O, the upper unit can go up or down in upright I, to an adjustable degree E controlled by a gear 21 and a worm operated by a handwheel 22, the gear acting as a nut for a screw connected to the inlet shaft, 23.

Pressing stress is provided by hydraulic jacks 24, which may be replaced by springs 24a or levers.

The entire assembly turns in the direction of the arrows F at exactly the same speed, to avoid any slippage which would ruin the filter elements 19, which may be of natural, artificial or metal cloth.

Compressible strips 25 hold the products on the filter belts 19.

This description is not limitative, and all types of materials may enter into the execution of this machine depending on the function of each component.

Driven by shaft 6, the unit turns slowly in the direction indicated by the arrows. Speed should be slow and continuous so as to give the liquid the time to run off.

Jacks 24 are adjusted to a constant pressure by a slide device controlled by the pressure.

Spacing E is adjusted according to the layer let in on the cloth 19.

With the space decreasing between the two caterpillars, the pressure on the liquid will increase to expel it through the filters.

To provide complete pressing and removal of liquid the machine should be of sufficient length L, which may be as much as 30 or 40 meters.

In particular, the invention covers the following characteristics and possible combinations thereof.

I claim:
1. A continuous filter press having a lower filter section and an upper filter section, said lower filter section comprising a pair of longitudinally spaced apart drums mounted for rotational movement about horizontally disposed parallel axes, an endless filter belt operable about said drums with the upper run of the belt being substantially horizontally disposed, a pair of longitudinally spaced apart gears located between the spaced drums and mounted for rotational movement about horizontally disposed axes with a line between the axes of the gears being substantially parallel with a line drawn between the axes of the drums, an endless linked track operable about said gears and shoes extending outwardly from the links of the track and pivoted to adjacent links whereby the shoes come into engagement with the underside of the upper run of the belt for support, and means for rotating said gears and drum for linear displacement of the belt and track at substantially the same speed, said upper filter section comprising a pair of longitudinally spaced apart drums mounted for rotational movement about horizontally disposed parallel axes, an endless filter belt operable about said drums, a second pair of gears located between the spaced drums for rotational movement about horizontally disposed parallel axes with a line drawn between the axes of the gears extending at an angle with respect to a line drawn between the axes of the drums, an endless linked track operable about said gears, and shoes extending outwardly from said track into engagement with the lower run of the belt between the drums whereby said belt is deflected from its path of travel between the drums with the lower run angled in the direction towards the upper run of the belt in the lower section, means for rotating the gears and drums for linear displacement of said belt and track at substantially the same speed and at a speed corresponding to the linear speed of the lower belt, and means operatively conected to the first pair of gears for raising and lowering one of the gears of the upper section for rocking movement of the gear and track about the other gear to adjust the angle between gears whereby the angle between the adjacent runs of the belts is correspondingly adjusted, said second pair of gears being mounted for vertical displacement, and spring means associated with said second pair of gears for constantly urging said second pair of gears in the downwardly direction.

2. A continuous filter press as claimed in claim 2 in which the belts have compressible side walls extending outwardly from the edges for confinement of material on the surface of the belt.

References Cited

UNITED STATES PATENTS

| Re. 22,200 | 10/1942 | Richardson | 100—154 X |
| 249,852 | 11/1881 | Mercier | 100—154 X |
| 705,071 | 7/1902 | Graham | 100—154 |
| 836,776 | 11/1906 | Oliver | 100—154 |
| 3,084,987 | 4/1963 | Bounin | 210—77 |

FOREIGN PATENTS 881,969  11/1961  Great Britain.

SAMIH N. ZAHARNA, *Primary Examiner.*
REUBEN FRIEDMAN, *Examiner.*